United States Patent [19]
Gray

[11] 3,890,548
[45] June 17, 1975

[54] PULSED CAPACITOR DISCHARGE ELECTRIC ENGINE

[75] Inventor: Edwin V. Gray, Northridge, Calif.

[73] Assignee: Evgray Enterprises, Inc., Van Nuys, Calif.

[22] Filed: Nov. 2, 1973

[21] Appl. No.: 412,415

[52] U.S. Cl. ............... 318/139; 318/254; 318/439; 310/46
[51] Int. Cl. ........................................... H02p 5/00
[58] Field of Search ............. 310/46, 5, 6; 318/194, 318/439, 254, 139; 320/1; 307/110

[56] References Cited
UNITED STATES PATENTS

| | | | |
|---|---|---|---|
| 2,085,708 | 6/1937 | Spencer | 318/194 |
| 2,800,619 | 7/1957 | Brunt | 318/194 |
| 3,579,074 | 5/1971 | Roberts | 320/1 |
| 3,619,638 | 11/1971 | Phinney | 307/110 |

OTHER PUBLICATIONS

Frungel, *High Speed Pulse Technology*, Academic Press Inc., 1965, pp. 140-148.

Primary Examiner—Robert K. Schaefer
Assistant Examiner—John J. Feldhaus
Attorney, Agent, or Firm—Gerald L. Price

[57] ABSTRACT

There is disclosed herein an electric machine or engine in which a rotor cage having an array of electromagnets is rotatable in an array of electromagnets, or fixed electromagnets are juxtaposed against movable ones. The coils of the electromagnets are connected in the discharge path of capacitors charged to relatively high voltage and discharged through the electromagnetic coils when selected rotor and stator elements are in alignment, or when the fixed electromagnets and movable electromagnets are juxtaposed. The discharge occurs across spark gaps disclosed in alignment with respect to the desired juxtaposition of the selected movable and stationary electromagnets. The capacitor discharges occur simultaneously through juxtaposed stationary movable electromagnets wound so that their respective cores are in magnetic repulsion polarity, thus resulting in the forced motion of movable electromagnetic elements away from the juxtaposed stationary electromagnetic elements at the discharge, thereby achieving motion. In an engine, the discharges occur successively across selected ones of the gaps to maintain continuous rotation. Capacitors are recharged between successive alignment positions of particular rotor and stator electromagnets of the engine.

18 Claims, 19 Drawing Figures

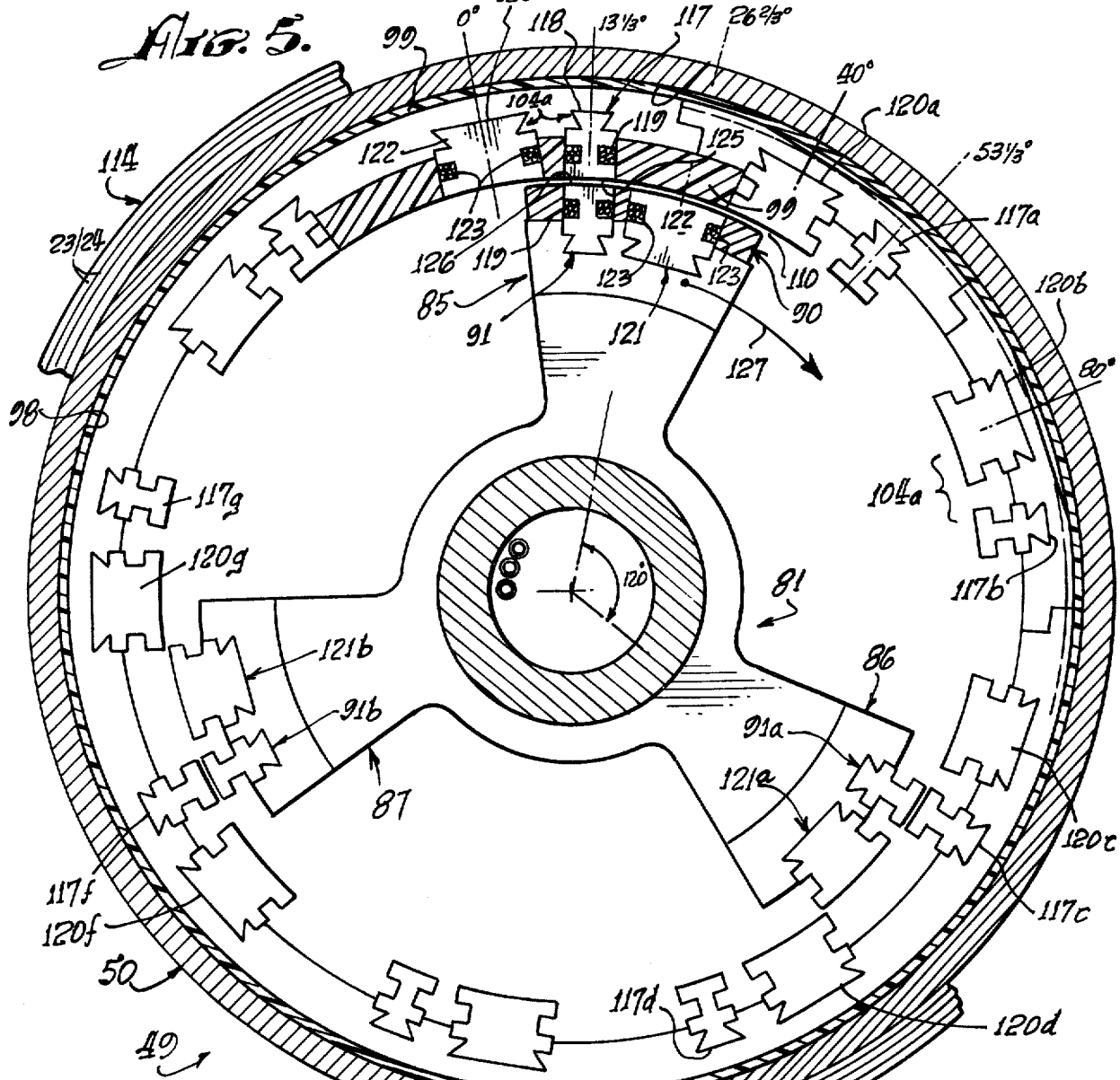

PATENTED JUN 17 1975 3,890,548

SHEET 4

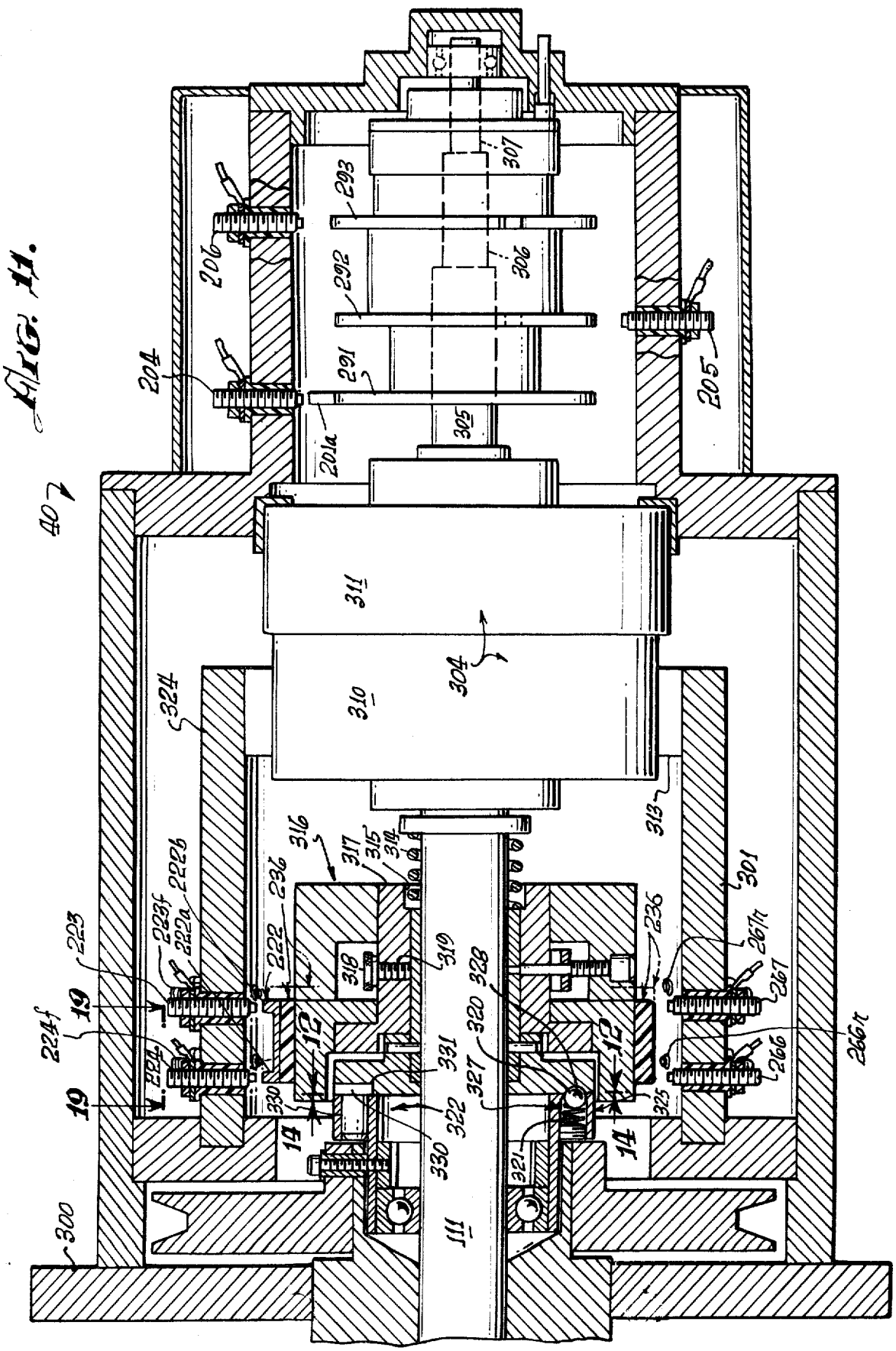

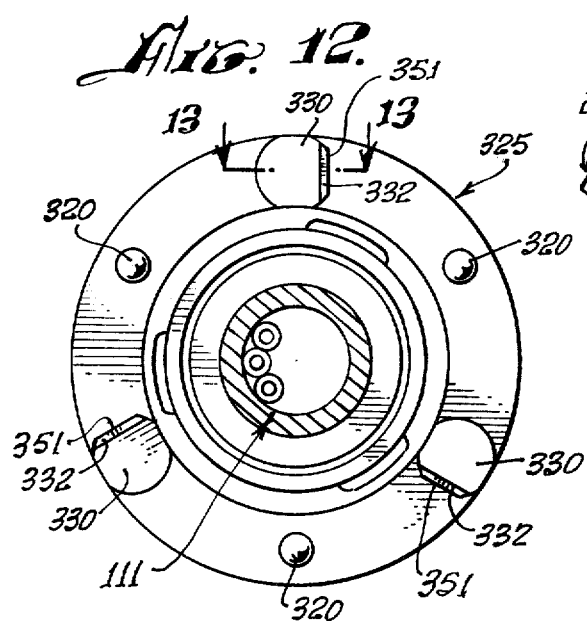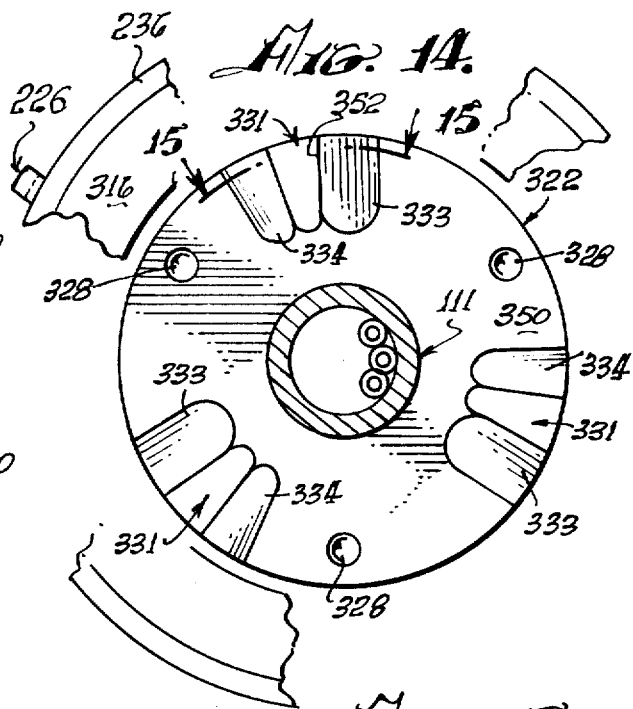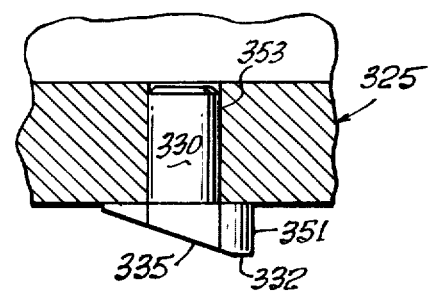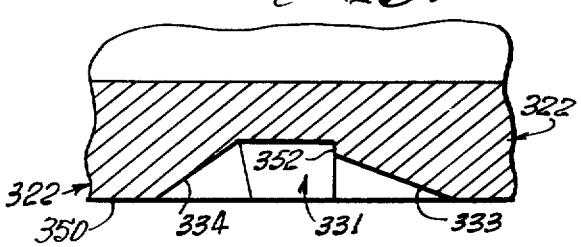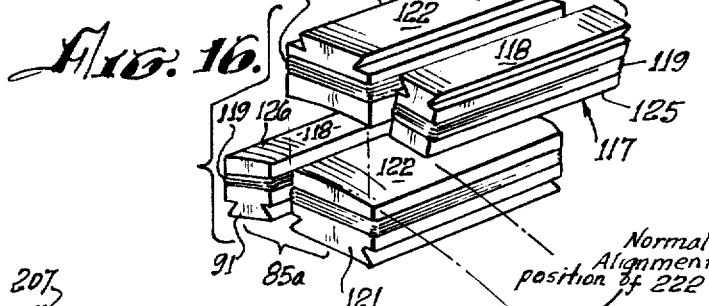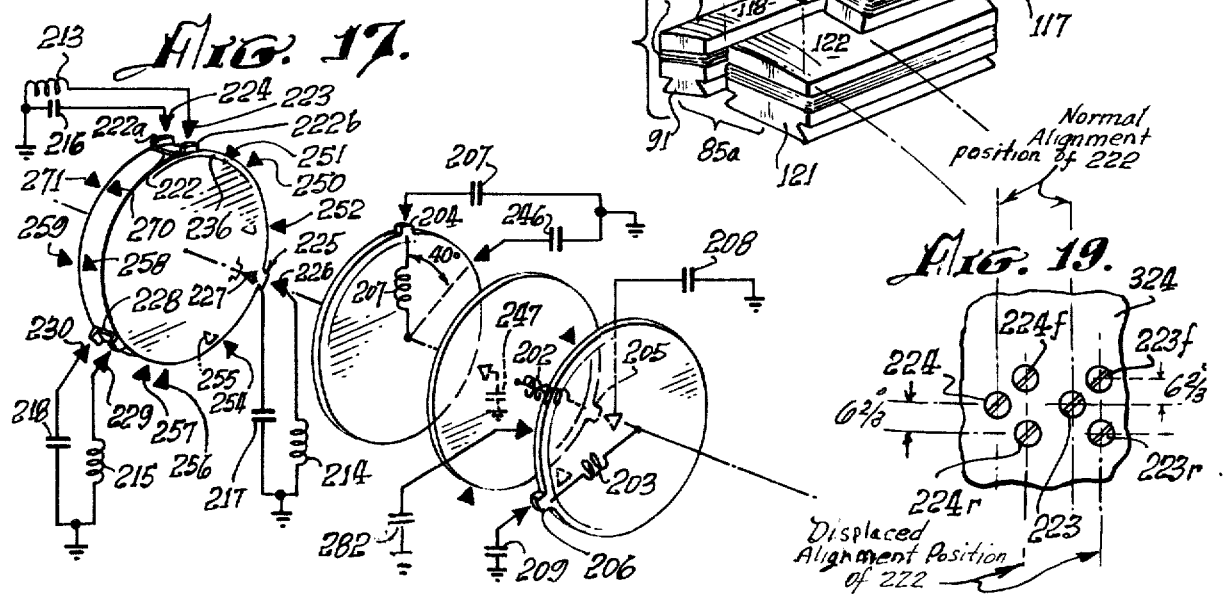

PULSED CAPACITOR DISCHARGE ELECTRIC ENGINE

BACKGROUND OF THE INVENTION

1. Field of the Invention

There is no known engine or motor operated on the principle of the present invention, that a capacitor charged to a relatively high voltage from a low-voltage d-c source is discharged across a spark gap to provide current through motor drive coils in the discharge path, these being solenoids which generate motion by magnetic repulsion of juxtaposed pairs of cores. The solenoids are preferably configured in motor and stator assemblies to effect motion of the rotor element with respect to the stator.

The present invention utilizes this principle to provide a rotary motion machine or engine which can develop considerable torque through the magnetic repulsion action of rotor and stator cores wound with coils through which capacitors are discharged synchronously with the positioning of the rotor coils opposite particular stator coils. Similarly, a linear action can be achieved with a stationary electromagnet juxtaposed against a movable electromagnet and the movable electromagnet can perform work with a tool or piston attached thereto.

A novel control mechanism is associated with the rotor is the engine to position discharge elements appropriately to create the desired discharge through the electromagnet coils when the juxtaposed rotor and stator electromagnets are in alignment. The electromagnets in the stator and rotor are so arranged that the control mechanism can advance or retard the discharge points relative to rotor-stator positions for control of rotational speed.

The discharge overshoot or back e.m.f. from the collapsing fields in the coils from the capacitor discharge is used to energize external batteries for conservation of power. The recovered energy thus stored may be used to operate equipment associated with the engine or motive force producing device.

The engine or rotary electric machine of the invention is believed to operate on the principle of conservation of energy, in that once rotation is achieved, current is needed only at the instant of a capacitor discharge in order to advance the rotor. The rotor moves to the next discharge point on the inertia of the repulsion action. The capacitor is recharged during the interval and stores the energy until discharge at the next rotor-stator coil coincidence. Thus, the new engine produces torque and stores the excess energy for subsequent use.

In a linear motion device according to the invention, only a single pulse discharge is needed to perform work.

The applications of the engine include use as an electric automotive engine which is economical and which can regenerate a part of the energy consumed to provide power for other loads in the automotive electric vehicle. As a linear actuator an economical use of power is possible because each stroke will result from a single discharge pulse of a capacitor through a coil.

2. Prior Art

Heretofore, electric engines or motors have operated on the principle that a conductor carrying a current in a magnetic field tends to move perpendicularly to that field; the electromagnetic torque developed by an armature or rotating portion of the motor is proportional to the magnetic flux in the stationary field and to the armature current.

In direct current motors the field is created by current through two or more field coils disposed in opposing magnetic relationship in the motor casing, while current through a rotatable armature positioned in the field is alternatingly reversed in polarity to provide continuous motion. The polarity reversing mechanism is a commutator. Some d-c motors have their field windings electrically in parallel with the rotor armature winding and are called "shunt-wound" motors. Other d-c motors have field and armature windings connected in series. In both series and shunt motors commutators are used for reversing the magnetic polarity of the armature to maintain rotation within the field.

A third type of d-c motor utilizes a permanent magnet field so that the operating current passes only through the armature winding. Such motors also use polarity reversing commutators to maintain direction of rotation. Reversal of direction of motion is effected by reversing the polarity of applied d-c potential.

Control of speed of d-c motors is accomplished basically by decrease or increase of magnetic field flux or the current through the armature. Either or both of these effects can be accomplished by raising or lowering the applied potential. In shunt motors, a series resistance may be varied to produce speed changes. In a permanent magnet motor or series motor, speed variation is best accomplished by voltage variation with a variable resistance in series with the motor d-c supply.

In alternating current motors, as is well known, a rotating magnetic field is created in the stator, and the rotor may be wound with as many poles as there are in the stator, with terminals connected with slip rings, or the rotor may consist of solid bars shorted by rings on each end to form a "squirrel cage" configuration. The speed of an a-c motor depends on the frequency of the applied a-c energy, if the motor is synchronous.

"Universal" motors are operable on either a-c or d-c energy.

In stepping motors, a rotor is moved from one pole to the next adjacent pole with each application of current, the rotor remaining at that position until a next application of current. This is accomplished by switching the current on and off or by pulsing the current. Examples of stepping motors are described in U.S. Pat. No. 3,467,902 to Shimizu, et al., U.S. Pat. No. 3,462,667 to Jackson, and U.S. Pat. No. 3,599,069 to Welch.

Operation of the a-c and d-c motors described above involves the consumption of substantial electric current. These motors can generate electric current when driven externally by a mechanical force. External energy to rotate the generator rotors can be provided by hydroelectric and steam sources or by other electric motors. In some of these systems, a d-c motor source drives an a-c generator for conversion of d-c energy to a-c energy or a d-c motor may drive a d-c generator which delivers a higher voltage than the source.

An extensive prior art search by the applicant uncovered no capacitor-discharge-operated motor resembling that of the present invention. All motors of the patents located in the search employed direct electrical connection between coils and electric power sources. Where selective switching is involved, semiconductor devices are employed, such as silicon-controlled rectifiers. Capacitors are used only for starting and phasing purposes, and not for basic motor operation from the discharge thereof, as in this invention.

SUMMARY OF THE INVENTION

This invention relates to electric motors or engines, and more particularly to a new electric machine including electromagnetic poles in a stator configuration and electromagnetic poles in a rotor configuration wherein in one form thereof the rotor is rotatable within the stator configuration and where both are energized by capacitor discharges through rotor and stator electromagnets at the instant of the alignment of a rotor electromagnet with a stator electromagnet. The rotor electromagnet is repelled from the stator electromagnet by the discharge of the capacitor through the coils of both the stator and rotor electromagnets at the same instant.

In an exemplary rotary engine according to this invention, rotor electromagnets may be disposed 120° apart on a central shaft and major stator electromagnets may be disposed 40° apart in the motor housing about the stator periphery. Other combinations of rotor elements and stator elements may be utilized to increase torque or rotation rate.

In another form, a second electromagnet is positioned to one side of each of the major stator electromagnets on a center line 13⅓° from the center line of the stator magnet, and these are excited in a predetermined pattern or sequence. Similarly to one side of each major rotor electromagnet is a second electromagnet spaced on a 13⅓° center line from the major rotor electromagnet. Electromagnets in both the rotor and stator assemblies are identical, the individual electromagnets of each being aligned axially and the coils of each being wired so that each rotor electromagnetic pole will have the same magnetic polarity as the electromagnet in the stator with which it is aligned and which it is confronting at the time of discharge of the capacitor.

Charging of the discharge capacitor or capacitors is accomplished by an electrical switching circuit wherein electrical energy from a battery or other source of d-c potential may be applied in alternating polarity to ignition coils or other voltage step-up arrangements from which a high voltage d-c potential is derived through rectification by diodes.

The capacitor charging circuit comprises a pair of high frequency switchers which feed respective automotive-type ignition coils employed as step-up transformers. The "secondary" of each of the ignition coils provides a high voltage square wave to a half-wave rectifier to generate a high voltage output pulse of d-c energy with each switching alternation of the high frequency switcher. Only one polarity is used so that a unidirectional pulse is applied to the capacitor bank being charged.

Successive unidirectional pulses are accumulated on the capacitor or capacitor bank until discharged. Discharge of the bank of capacitors occurs across a spark gap by arc-over. The gap spacing determines the voltage at which discharge or arc-over occurs. An array of gaps is created by fixed elements in the engine housing and moving elements positioned on the rotor shaft. At the instant when the moving gap elements are positioned opposite fixed elements during the rotor rotation, a discharge occurs through the coils of the aligned rotor and stator electromagnets to produce the repulsion action between the stator and rotor electromagnet cores.

A plurality of fixed gap elements are arrayed in the motor housing to correspond to the locations of the stator electromagnets in the housing. The rotor gap elements correspond to the positions of the rotor electromagnets on the rotor so that at the instant of correct alignment of the gaps the capacitors are discharged to produce the necessary current through the stator and rotor coils to cause the electromagnets to repel one another.

The charging circuits are arranged in pairs, and are such that the discharge occurs through both rotor and stator windings of the electromagnets, which are opposite one another when the spark gap elements are aligned and arc-over.

The speed of the rotor can be changed by means of a clutch mechanism associated with the rotor. The clutch shifts the positions of the rotor gap elements so that the discharge will energize the stator coils in a manner to advance or retard the time of discharge with respect to the normal rotor/stator alignment positions. The discharge through the rotor and stator then occurs when the rotor has passed the stator 6⅔° for speed advance.

By causing the discharge to occur when the rotor position is approaching the stator, the repulsion pulse occurs 6⅔° before the alignment position of the rotor and stator electromagnets, thus slowing the speed.

The clutch mechanism for aligning capacitor discharge gaps for discharge is described as a control head. It may be likened to a firing control mechanism in an automotive combustion engine in that it "fires" the electromagnets and provides a return of any discharge overshoot potential back to the battery or other energy source.

The action of the control head is extremely fast. From the foregoing description, it can be anticipated that an increase in the speed or a decrease in speed of rotation can occur within the period in which the rotor electromagnet moves between any pair of adjacently located electromagnets in the stator assembly, which are 40° apart in the exemplary engine according to the invention. Thus, speed changes can be effected in a maximum of one-ninth of a revolution.

The rotor speed-changing action of the control head and its structure are believed to be further novel features of the invention, in that they maintain normal 120° firing positions during uniform speed or rotation conditions, but shift to ±6⅔° longer or shorter intervals for speed change by the novel shift mechanism in the rotor clutch assembly.

Accordingly, the preferred embodiment of this invention is an electric rotary engine wherein motor torque is developed by discharge of high potential from a bank of capacitors through stator and rotor electromagnet coils when the electromagnets are in alignment. The capacitors are charged from batteries by a switching mechanism, and are discharged across spark gaps set to achieve the discharge of the capacitor charge voltage through the electromagnetic coils when the gaps and predetermined rotor and stator electromagnet pairs are in alignment.

Exemplary embodiments of the invention are herein illustrated and described. These exemplary illustrations and description should not be construed as limiting the invention to the embodiments shown, because those skilled in the arts appertaining to the invention may conceive of other embodiments in the light of the description within the ambit of the appended claims.

BREIF DESCRIPTION OF THE DRAWINGS

FIG. 5 is a sectional view taken at line 5—5 in FIG. 4;

FIGS. 6 and 7 are fragmentary sectional views, corresponding to a portion of FIG. 5, illustrating successive advanced positions of the engine rotor therein;

FIG. 11 is a sectional view taken at line 11—11 in FIG. 3, illustrating the control head or novel speed change controlling system of the engine;

FIG. 12 is a sectional view, taken at line 12—12 in FIG. 11, showing a clutch plate utilized in the speed change control system of FIG. 11;

FIG. 13 is a fragmentary view, taken at line 13—13 in FIG. 12;

FIG. 14 is a sectional view, taken at line 14—14 in FIG. 11, showing a clutch plate which cooperates with the clutch plate of FIG. 12;

FIG. 15 is a fragmentary sectional view taken at line 15—15 of FIG. 13;

FIG. 16 is a perspective view of electromagnets utilized in the present invention;

FIG. 17 is a schematic diagram showing cooperating mechanical and electrical features of the programmer portion of the invention;

FIG. 19 is a developed view, taken at line 19—19 of FIG. 11, showing the locations of displaced spark gap elements of the speed changing mechanism of an engine according to the invention.

DESCRIPTION OF THE PREFERRED EMBODIMENT

As hereinbefore mentioned, the basic principle of operation of the engine of the invention is the discharge of a capacitor, across a spark gap through an inductor. When a pair of inductors is used, and the respective magnetic cores thereof are arranged opposite and another in magnetic polarity repulsion relation, the discharge through them causes the cores to repel each other with considerable force.

Figure 1:
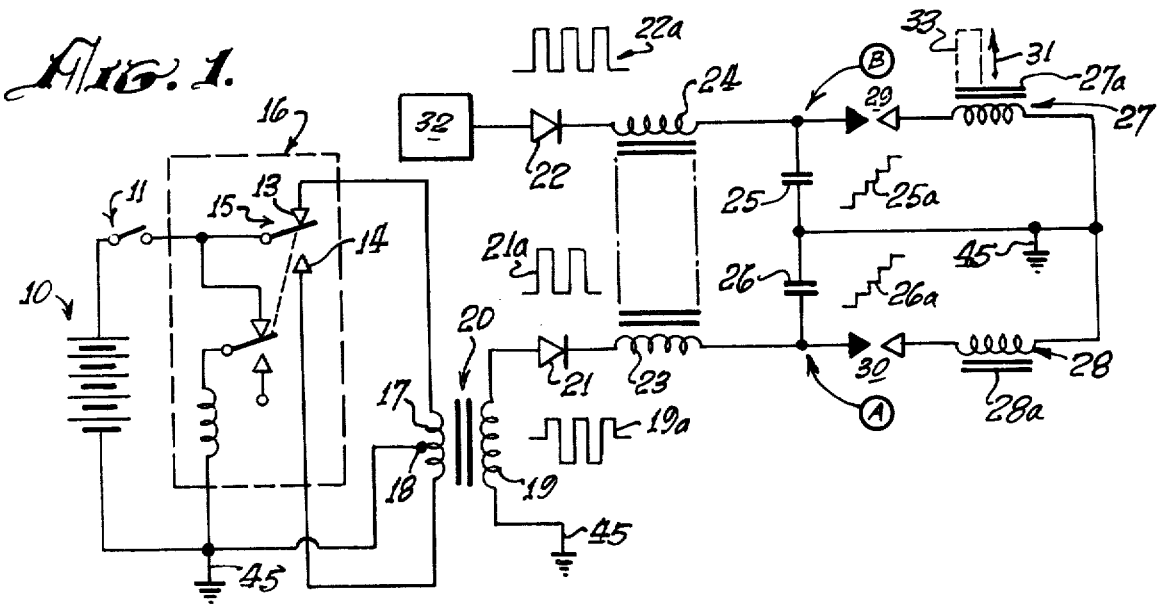
FIG. 1 is an explanatory schematic diagram of a capacitor charging and discharging circuit utilized in the present invention.

Referring to the electrical schematic diagram of FIG. 1, a battery 10 energizes a pulse-producing vibrator mechanism 16, which may be of the magnetic type incorporating an armature 15 moving between contacts 13 and 14, or of the transistor type (not shown) with which a high frequency bipolar pulsed output is produced in primary 17 of transformer 20. The pulse amplitude is stepped-up in secondary 19 of transformer 20. Wave form 19a represents the bidirectional or bipolar pulsed output. A diode rectifier 21 produces a unidirectional pulse train, as indicated at 21a, to charge capacitor 26. A delay coil 23 is connected in series with the unipolar pulsed output to capacitor 26. Successive unidirectional pulses of wave 21a charge capacitor 26 to a high level, as indicated at 26a, until the voltage amplitude at point A reaches the breakdown potential of spark gap 30. At the breakdown of spark gap 30, capacitor 26 discharges across the arc created through the inductor coil 28. A current pulse is produced which magnetizes core 28a. Simultaneously, another substantially identical charging system 32 produces a discharge through inductor 27 across spark gap 29 to magnetize core 27a. Cores 28a, 27a are wound with coils 28, 27 so that their magnetic polarities are the same. As the cores 27a, 28a confront one another, they tend to fly apart when the discharge occurs through coils 27 and 28 because of repulsion of identical magnetic poles, as indicated by arrow 31. If core 28a is fixed or stationary and core 27a is movable, then core 27a may have tools 33 attached to it to perform work when the capacitor discharges.

Figure 2:
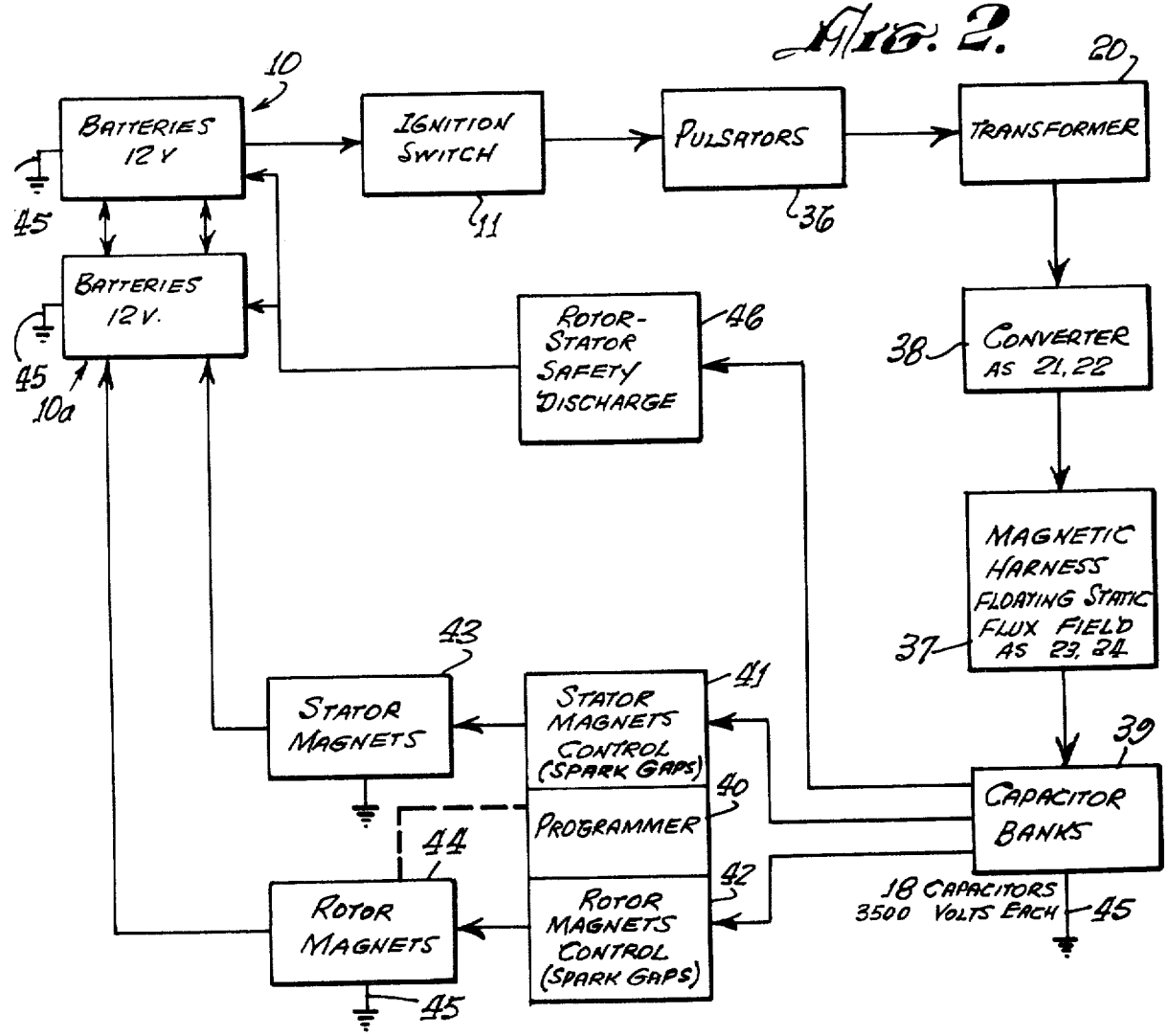
FIG. 2 is a block diagram of an exemplary engine system according to the invention.

Referring to FIGS. 1 and 2, a d-c electrical source or battery 10 energizes pulsators 36 (including at least two vibrators 16 as previously described) when switch 11 between the battery 10 and pulsator 36 is closed, to apply relatively high frequency pulses to the primaries of transformers 20. The secondaries of transformers 20 are step-up windings which apply bipolar pulses, such as pulses 19a (FIG. 1) to the diodes in converter 38. The rectified unidirectional pulsating output of each of the diodes in converter 38 is passed through delay coils 23, 24, thus forming a harness 37 wound about the case of the engine, as hereinafter described, which is believed to provide a static floating flux field. The outputs from delay lines 37 drive respective capacitors in banks 39 to charge the capacitors therein to a relatively high charge potential. A programmer and rotor and stator magnet control array 40, 41, 42 is formed by spark gaps positioned, as hereinafter described, so that at predetermined positions of the rotor during rotation of the engine, as hereinafter described, selected capacitors of capacitor banks 39 will discharge across the spark gaps through the rotor and stator electromagnets 43, 44. The converters 38, magnetic harness 37, capacitor banks 39, programmer 40, and controls 41, 42 from a series circuit path across the secondaries of transformers 20 to the ground, or point of reference potential, 45. The capacitor banks 39 are discharged across the spark gaps of programmer 40 (the rotor and stator magnet controls 41, 42). The discharge occurs through the coils of stator and rotor electromagnets 43, 44 to ground 45. Stator and rotor electromagnets are similar to those shown at 27, 27a, 28, 28a in FIG. 1.

The discharge through the coils of stator and rotor electromagnets 43, 44 is accompanied by a discharge overshoot or return pulse, the output of which is applied in an appropriate polarity to a secondary battery 10a to store this excess energy. The overshoot pulse returns to battery 10a because after discharge the only path open is that to battery 10a, since the gaps in 40, 41 and 42 have broken down, because the capacitors in banks 39 are discharged and have not yet recovered the high voltage charge from the high frequency pulsers 36 and converter rectifier units 38.

In the event of a misfire in the programmer control circuits 40, 41, 42, the capacitors are discharged through a rotor safety discharge circuit 46 and returned to batteries 10–10a, adding to their capacity. The circuit 46 is connected between the capacitor banks 39 and batteries 10, 10a.

Figure 3:
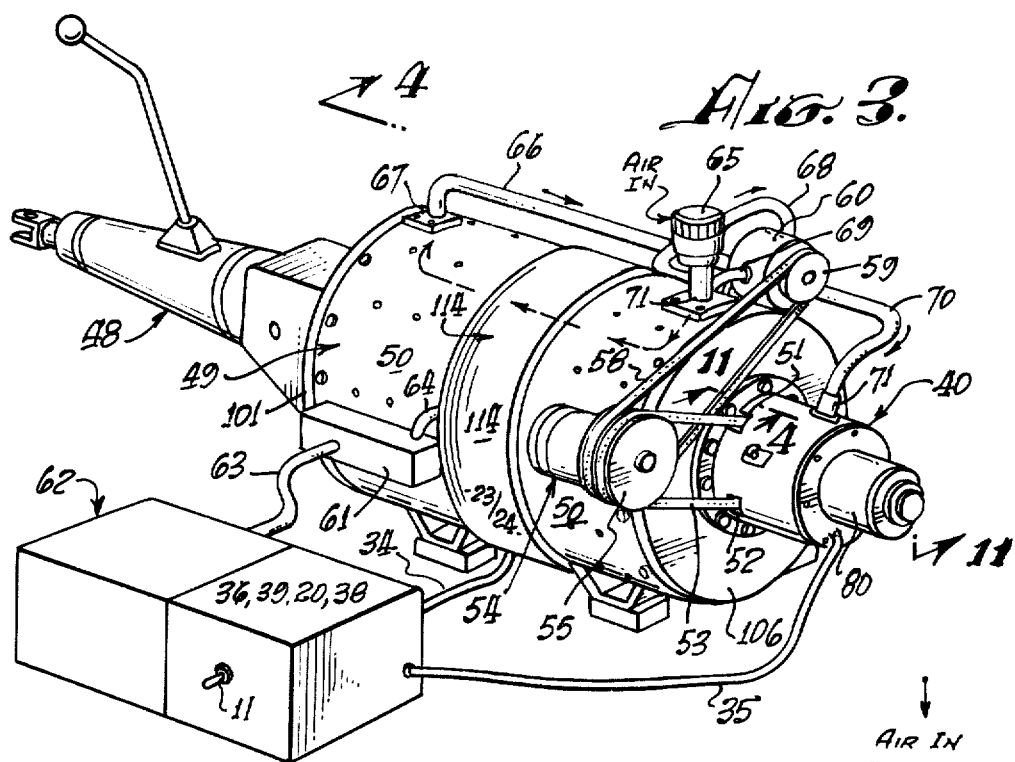
FIG. 3 is a perspective view of a typical engine system according to the invention, coupled to an automotive transmission.

Referring to FIG. 3, a motor or engine 49 according to the present invention is shown connected with an automotive transmission 48. The transmission 48 represents one of many forms of loads to which the engine may be applied. A motor housing 50 encases the operating mechanism hereinafter described. The programmer 40 is axially mounted at one end of this housing. Through apertures 51, 52 a belt 53 couples to a pulley 57 (not shown in this view) and to an alternator 54 attached to housing 50. A pulley 55 on the alternator has two grooves, one for belt 53 to the drive pulley 58 on the shaft (not shown) of the engine 49, and the other for a belt 58 coupled to a pulley 59 on a pump 60 attached to housing 50. A terminal box 61 on the housing interconnects means between the battery assembly 62 and motor 49 via cables 63 and 64.

An intake 65 for air is coupled to pump 60 via piping 68, 69 and from pump 60 via tubing or piping 66, 70 to the interior of housing 50 via coupling flanges 67 and 71. The air flow tends to cool the engine, and the air may preferably be maintained at a constant temperature and humidity so that a constant spark gap discharge condition is maintained. A clutch mechanism 80 is provided on programmer 40.

Figure 4:
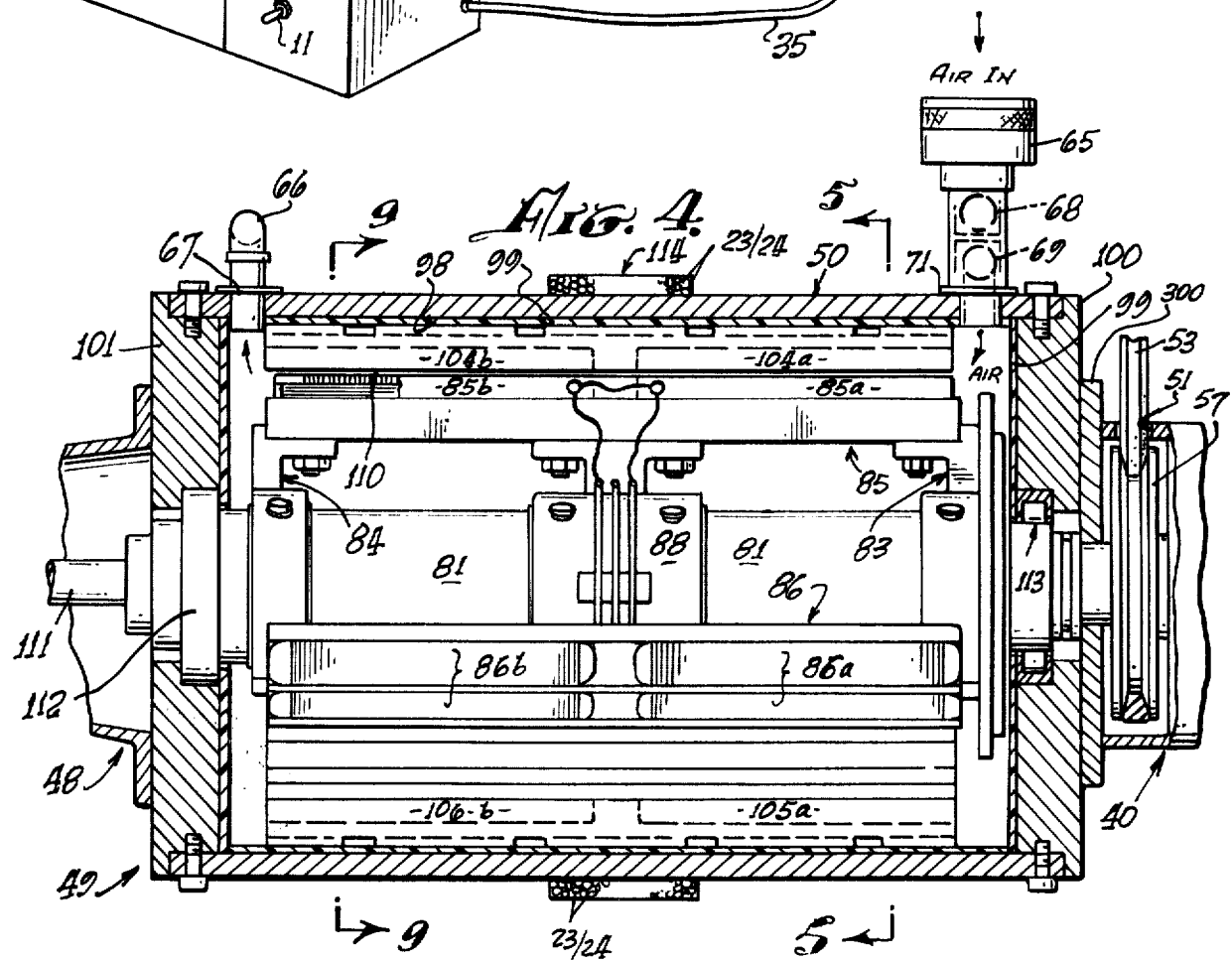
FIG. 4 is an axial sectional view taken at line 4—4 in FIG. 3.
Figure 8:
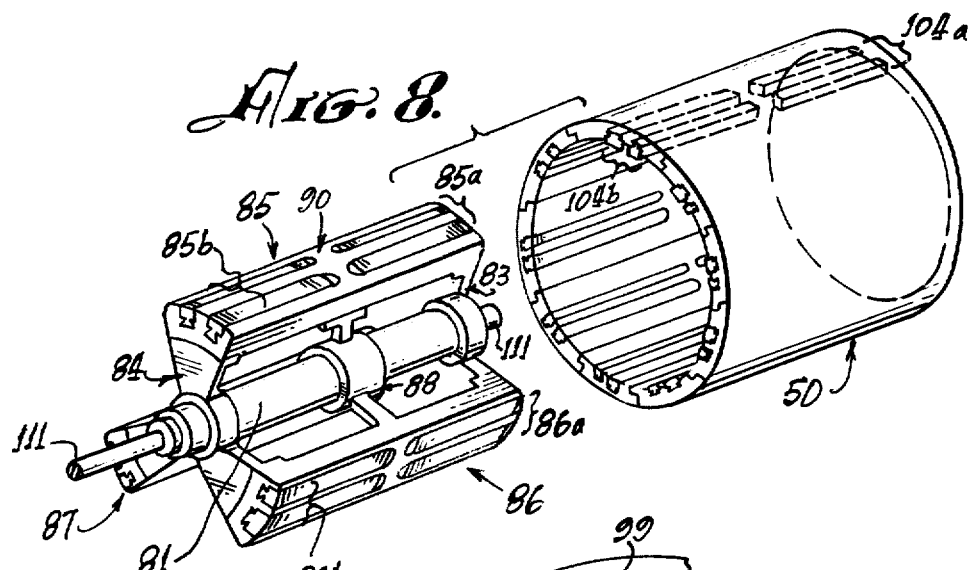
FIG. 8 is an exploded perspective view of the rotor and stator of the engine of FIGS. 3 and 4.
Figure 9:
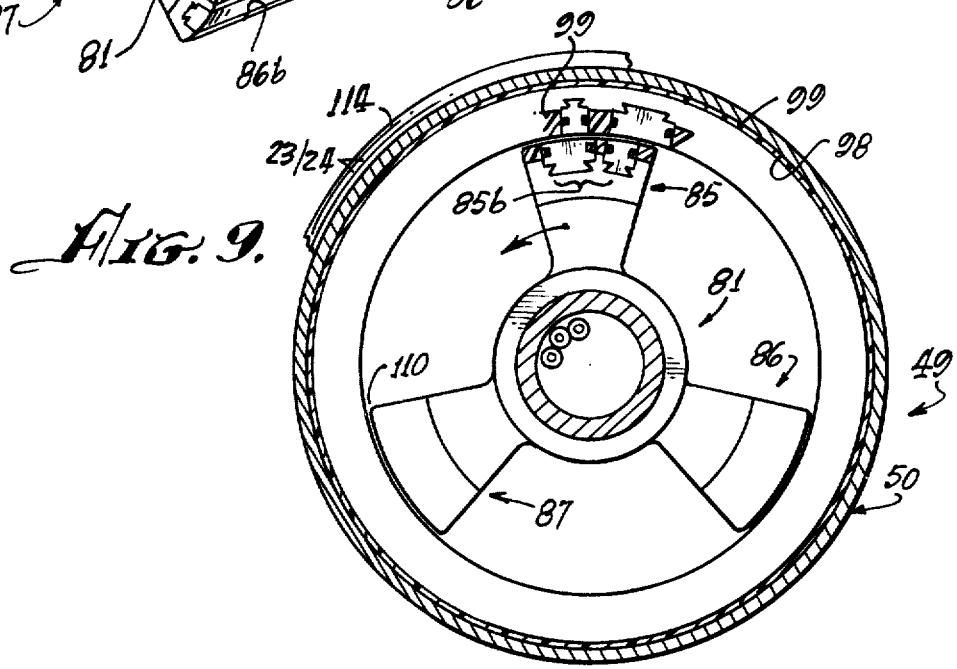
FIG. 9 is a cross-sectional view taken at line 9—9 of FIG. 4.
Figure 10:
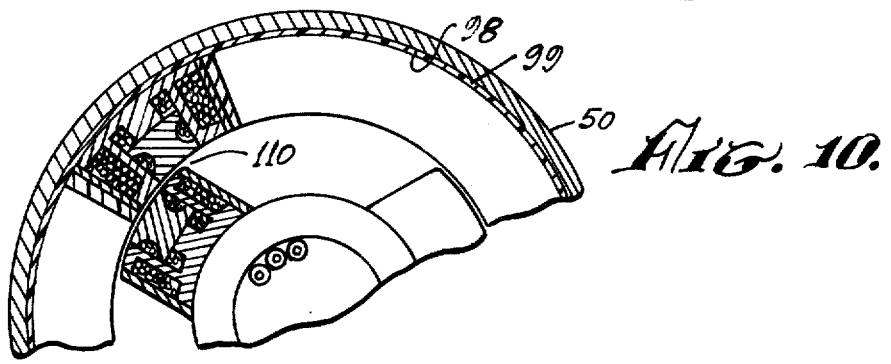
FIG. 10 is a partial sectional view, similar to the view of FIG. 9, illustrating a different configuration of electromagnets in another engine embodiment of the invention.

Referring to FIGS. 4, 5 and 9, rotor 81 has spider assemblies 83, 84 with three electromagnet coil assembly sets mounted thereon, two of which are shown in FIG. 4, on 85 at 85a and 85b, and on 86 at 86a and 86b. One of the third electromagnet coil assemblies, designated 87a, is shown in FIG. 5, viewed from the shaft end. As more clearly shown in the perspective view of FIG. 8, a third spider assembly 88 provides added rigidity and a central support for the rotor mechanism on shaft 81.

The electromagnet sets 85a and 85b, 86a and 86b, 87a and 87b, disposed on rotor 81 and spiders 83, 84, and 88 each comprise pairs of front units 85a, 86a, 87a and pairs of rear units 85b, 86b, 87b. Each pair consists of a major electromagnet and a minor electromagnet, as hereinafter described, which are embedded in an insulating material 90, which insulates the electromagnet coil assemblies from one another and secures the electromagnets rigidly in place on the spider/rotor cage 81, 83, 84, 88.

The interior wall 98 of housing 50 is coated with an electrically insulating material 99 in which are embedded electromagnet coils, as hereinafter described, and the interiors of end plates 100, 101 of the housing 50. On the insulating surface 98 of housing 50 is mounted a series of stator electromagnet pairs 104a, identical with electromagnet pairs 85a, 86a, 87a, etc. Electromagnet pairs such as 104a or 105a are disposed every 40° about the interior of housing 50 to form a stator which cooperates with the rotor 81–88. An air gap 110 of very close tolerance is defined between the rotor and stator electromagnets, and air from pump 65 flows through this gap.

As shown in FIG. 8, the electromagnet assemblies, such as 85 through 87, of the rotor and magnet assemblies, such as 104a in the stator are so embedded in their respective insulative plastic carriers (rotor and stator) that they are smoothly rounded in a concave contour for the stator, and in a convex contour on the rotor to permit smooth and continuous rotation of rotor 81 in stator housing 50. The air gap 110 is uniform at all positions of any rotor element within the stator assembly, as is clearly shown in FIG. 16.

The rotor 81 and spiders 83, 84, 88 are rigidly mounted on a shaft 111 journaled in bearing assemblies 112, 113 which are of conventional type, for easy rotation of the rotor on shaft 111 within housing 50.

Around the central outer surface of housing 50 are wound a number of turns of wire 23, 24 to provide a static flux coil 114 as hereinbefore described, which is a delay line, as previously described.

FIGS. 5, 6, 7 and 9 are cross-sectional views of the rotor assembly 81–88, arranged to show the positioning and alignment of the rotor and stator electromagnet coil assemblies at successive stages of the rotation of rotor 81–88 through a portion of a cycle of operation thereof. For example, in FIG. 5 the rotor assembly 81–88 is shown so positioned that a minor rotor electromagnet assembly 91 is aligned with a minor stator electromagnet assembly 117.

As shown in further detail in FIG. 16, minor electromagnet assembly 117 consists of an iron core 118, grooved so that there may be wound thereabout a coil of wire 119. Core 118 is the same in stator electromagnet 117 as it is in rotor electromagnet 91.

As a position 13⅓° to the right of rotor electromagnet 91, as viewed in FIGS. 5 and 16, there is a second or major rotor electromagnet 121 which has a winding 123 about its core 122. The electromagnets 91, 121 are the pair 85a of FIGS. 4 and 8.

At a position 13⅓° to the left of stator electromagnet 117, as viewed in FIG. 5, there is a second or major stator electromagnet 120 whose core 122 is of the same configuration as core 122 of rotor electromagnet 121. A winding 123 about core 122 of electromagnet 120 is of the same character as winding 123 on electromagnet 121.

Electromagnet assembly pair 85a on the rotor is identical in configuration with that of the electromagnet stator assembly pair 104a except for the position reversal of the elements 117–120 and 91–121 of the respective pairs.

There are nine pairs of electromagnets 120–117 (104a) disposed at 40° intervals about the interior of housing 50. The center line of core 122 of electromagnet 120 is positioned 13⅓° to the left of the center line of the core 118 of electromagnet 117. Three pairs of electromagnets 85a, 86a, 87a are provided on rotor assembly 81–88 as shown in FIG. 5.

Other combinations are possible, but the number of electromagnets in the rotor should always be an integral fraction of the number of electromagnets in the stator. As shown in FIG. 8, for the rotor assembly 85a, 85b, there are three of each of the front and back pairs of electromagnetic assemblies. Similarly, as shown in FIGS. 4 and 8, there are nine front and back pairs of electromagnets in the stator such as 104a and 104b.

In order to best understand the operation of the rotor 81–88 rotating within the stator housing 50 of an engine according to this invention, the positions of rotor electromagnets 91 and stator electromagnets 117 are initially exactly in line at the 13⅓° peripheral starting position marked on the vertical center line of FIG. 5. The winding direction of the coils of these magnets is such that a d-c current through the coils 119 will produce a particular identical magnetic polarity on each of the juxtaposed surfaces 125 of magnet 117, and 126 of magnet 91, (FIG. 5). FIGS. 16 and 6 illustrate the next step in the motion wherein the two major electromagnets, 120 in the stator and 121 in the rotor, are in alignment.

When the d-c discharges from the appropriate capacitors in banks 39 occur simultaneously across spark gaps through the coils 119 of electromagnets 117 and 91, at the instant of their alignment, their cores 118 will repel one another to cause rotor assembly 81–88 to rotate clockwise in the direction indicated by arrow 127. The system does not move in the reverse direction because it has been started in the clockwise direction by the alternator motor 54 shown in FIG. 3, or by some other starter means. If started counterclockwise, the rotor will continue to move counterclockwise.

As hereinbefore noted, the discharge of any capacitor occurs over a very short interval across its associated spark gap, and the resulting magnetic repulsion action imparts motion to the rotor. The discharge event occurs when electromagnets 117 and 91 are in alignment. As shown in FIG. 5, rotor electromagnet 91a is aligned with stator electromagnet 117c, and rotor electromagnet 91b is aligned with stator electromagnet 117e at the same time that similar electromagnets 117 and 91 are aligned. A discharge occurs through all six of these electromagnets simultaneously (that is, 117, 91; 117c, 91a, 117e and 91b). A capacitor and a spark gap are required for each coil of each electromagnet. Where, as in the assembly shown in FIG. 8, front and back pairs are used, both the axial in-line front and back coils are energized simultaneously by the discharge from a single capacitor or from a bank of paralleled capacitors such as 25, 26 (FIG. 1). Although FIGS. 4 and 8 indicate the use of front and back electromagnets, it should be evident that only a single electromagnet in any stator position and a corresponding single electromagnet in the rotor position, may be utilized to accomplish the repulsion action of the rotor with respect to the stator. As stated, each electromagnet requires a discharge from a single capacitor or capacitor bank across a spark gap for it to be energized, and the magnetic polarity of the juxtaposed magnetic core faces must be the same, in order to effect the repulsive action to produce the rotary motion.

Referring to FIGS. 5 and 6, the repulsion action causes the rotor to move 13⅓° clockwise, while electromagnets 91, 91a and 91b move away from electromagnets 117, 117c and 117e to bring electromagnets 121, 121a and 121b into respective alignment with electromagnets 120a, 120d and 120f. At this time, a capacitor discharge across a spark-gap into their coils 123 occurs, thus moving the rotor. Another 13⅓° ahead, as shown in FIG. 7, major electromagnets 121, 121a and 121b come into alignment with minor electromagnets 117a, 117d and 117f, at which time a discharge occurs to repeat the repulsion action, this action continuing as long as d-c power is applied to the system to charge the capacitors in the capacitor banks.

Figure 18:
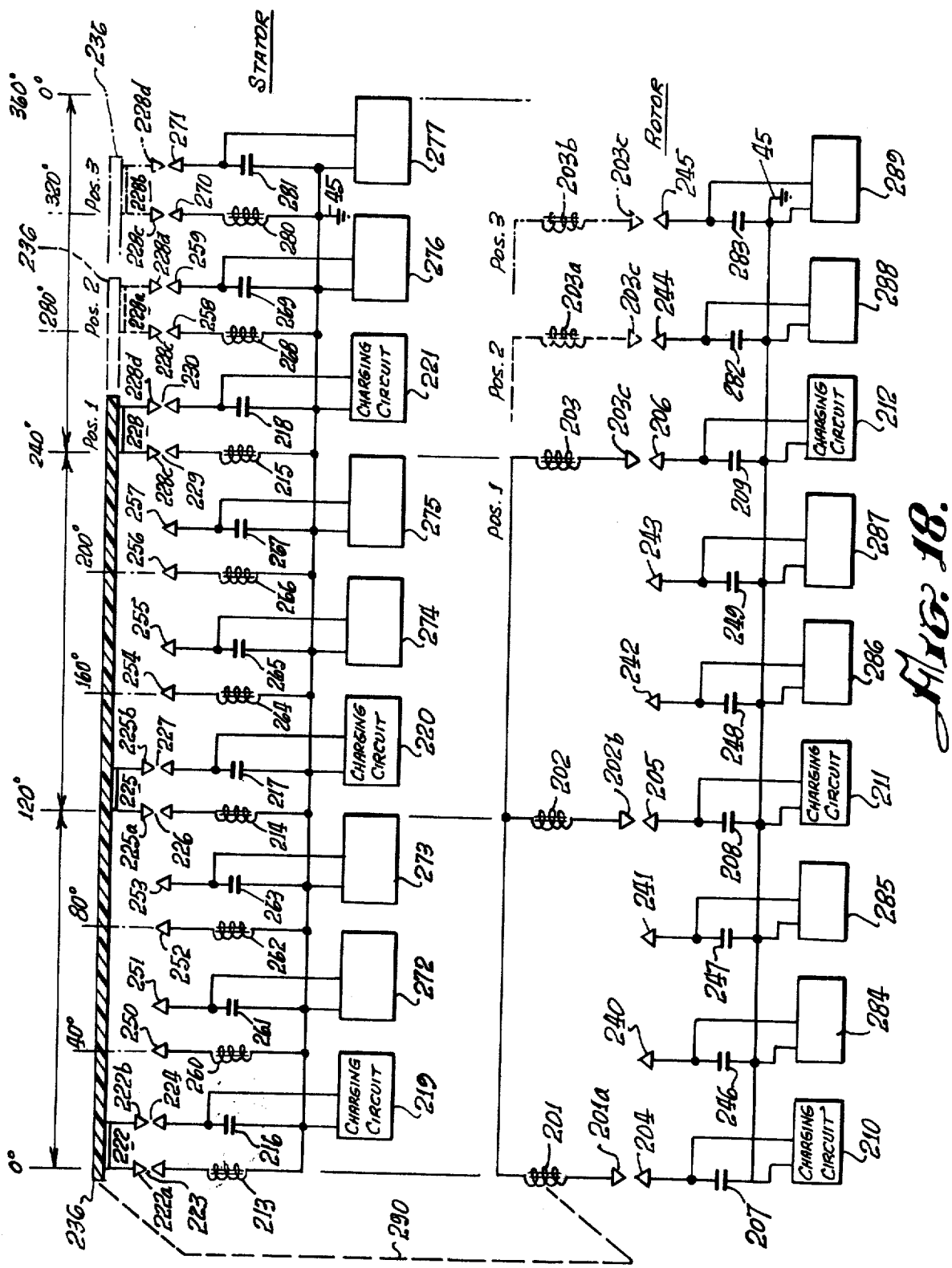
FIG. 18 is an electrical schematic diagram of an engine according to the invention, showing the electrical relationships of the electromagnetic components embodying a new principle of the invention.

FIG. 18 further illustrates the sequencing of the capacitor discharges across appropriate spark gap terminal pairs. Nine single stator coils and three single rotor coils are shown with their respective interconnections with the spark gaps and capacitors with which they are associated for discharge. When the appropriate spark gap terminals are aligned, at the points in the positioning of the rotor assembly for most effective repulsion action of juxtaposed electromagnet cores, the discharge of the appropriate charged capacitors across the associated spark gap occurs through the respective coils. The capacitors are discharged in sets of three through sets of three coils at each discharge position, as the rotor moves through the rotor positions. In FIG. 18, the rotor electromagnets are positioned linearly, rather than on a circular base, to show the electrical action of an electric engine according to the invention. These motor electromagnets 201, 202, and 203 are aligned with stator electromagnets 213, 214 and 215 at 0°, 120° and 450° respectively. The stator electromagnets are correspondingly shown in a linear schematic as if rolled out of the stator assembly and laid side by side. For clarity of description, the capacitors associated with the rotor operation 207, 208, 209 and 246, 247, 248, 249, 282 and 283 are arranged in vertical alignment with the respective positions of the rotor coils 201, 202, 203 as they move from left to right, this corresponding to clockwise rotation of the rotor. The stator coils 213, 214, 215, 260, 261, 262, 263, 264, 265, 266, etc. and capacitor combinations are arranged side by side, again to facilitate description.

An insulative disc 236 (shown in FIG. 17 as a disc, but opened out linearly in FIG. 18) has mounted thereon three gap terminal blocks 222, 225 and 228. Each block is rectangularly U-shaped, and each interconnects two terminals with the base of the U. Block 222 has terminals 222a and 222b, block 225 has terminals 225a and 225b, and block 228 has terminals 228c and 228d. When insulative disc 230 is part of the rotor, as indicated by mechanical linkage 290, it can be seen that terminal U 222 creates a pair of gaps with gap terminals 223 and 224, respectively. Thus, when the voltage on capacitor 216 from charging circuit 219 is of a value which will arc over the air spaces between 222a and 223, and between 222b and 224, the capacitor 216 will discharge into the coil of electromagnet 213 to ground. Similarly gap terminal U 225 forms a dual spark gap with gap terminals 226 and 227 to result in arc-over when the voltage on capacitor 217, charged by charging circuit 220, discharges into the coil of electromagnet 214. Also, U-gap terminal 228 with terminals 228c and 228d, creates a spark gap with terminals 229 and 230 to discharge capacitor 218, charged by charging circuit 221, into coil 215. At the same time, rotor coils, 201, 202 and 203 across gaps 201a–204, 202b–205 and 203c–206 each receives a discharge from respective capacitors 207, 208, and 209.

When the electromagnet coils 213, 214, 215 and 201, 202, 203 are energized, the repulsion action causes the rotor assembly to move to position 2 where a new simultaneous group of discharges occurs into rotor coils 201, 202, and 203 from capacitors 246, 248, and 282 across gaps 201a–240, 202b–242 and 203c–244. Simultaneously, because gap-U-elements 222, 225 and 228 have also moved to position 2 with the rotor assembly, capacitor 261 is discharged through electromagnet coil 260, capacitor 265 is discharged through electromagnet coil 264, and capacitor 269 is discharged through electromagnet coil 268 in alignment with position 2 of the rotor electromagnet coils, thus to cause the rotor electromagnets to move to position 3 where the discharge pattern is repeated now with capacitors 247, 249 and 283 discharging through the rotor electromagnet coils 201, 202, 203, and the capacitors 263, 267 and 281 discharging respectively through stator electromagnet coils 262, 266 and 280.

After each discharge the charging circuits 219-221 and 272-277 for the stator capacitors, and 210-212 and 284-289 for the rotor capacitors, are operated continuously from a battery source, as described earlier with reference to FIG. 1, to constantly recharge the capacitors to which each is connected. Those versed in the art will appreciate that, as each capacitor discharges across an associated spark gap, the resulting drop in potential across the gap renders the gap an open circuit until such time as the capacitor can recharge to the arc-over level of the gap. This recharge to a discharge potential occurs before a rotor element arrives at the next position in question.

The mechanical schematic diagram of FIG. 17 further clarifies the operation of the spark-gap discharge programming system. A forward disc 236 of an electrically insulative material, has thereon the set of U-shaped gap terminal connectors previously described. These are positioned at 0°, 120° and 240° respectively. In FIG. 17, schematic representations of the position of the coil and capacitor arrangements at the start of a cycle are shown to correspond to the description hereinabove with reference to FIG. 18. Accordingly, the coil and capacitor combinations 213/216, 214/217, and 215/218 are shown connected with their gap terminals, respectively, 223/224, 226/227 and 229/230. On the rotor coil and capacitor connection three separate discs 291, 292 and 293 are shown, each with a single gap terminal. The discs 291-293 are rotated so as to position their respective gap terminals 201a, 202b and 203c at 120° increments, with the 0° position corresponding to the 0° position of U-gap terminal 222 on disc 230.

Representative gap terminals are shown about the peripheries of discs 230, 291-293 to clearly indicate how, as the discs turn in unison, the gap alignments correspond so that three rotor coil/capacitor positions always line up with three stator coil/capacitors at 120° intervals about the rotary path, producing an alignment every 40°, there being nine stator coils. Thus there are three simultaneous discharges into stator coils and three into rotor coils at each 40° position. Nine positions displaced 40° apart provide a total of 27 discharge points for capacitors into the rotor coils and 27 discharge points for capacitors into the stator coils in one revolution.

It will be understood that, as illustrated in FIGS. 17 and 18, nine individual electromagnet coils are shown in the stator and three in the rotor, in order to show in its simplest form how the three rotor electromagnets are stepped forward from alignment with three of the stator electromagnets, when the appropriate spark gaps are in alignment, to effect the discharge of capacitors through juxtaposed pairs of rotor/stator electromagnets. The repulsion moves the rotor electromagnet from the stator electromagnet to the next alignment position advanced at an arc of 40° from the preceding alignment position. In the interval until another rotor electromagnet, 120° removed, is aligned with the stator electromagnet that had just been excited, the associated capacitor is recharged to a potential which will cause the spark gap to break down to produce another discharge of this capacitor on the next revolution. Thus the rotor moves from one position to the next, with capacitor discharges occurring each 40° of rotation, a total of nine per revolution. It should be obvious that, with other rotor/stator combinations, the number of electromagnet coincidences and spark-gap discharges will vary. For example, with the coil pairs shown in FIGS. 4 through 8, a total of 27 discharges will occur. Although there are 18 stator electromagnets and three rotor electromagnets, the discharge pattern is determined by the specific spark gap arrangement.

The rotor/stator configuration of FIGS. 5 and 8, involving the major and minor pairs of electromagnets such as 85a and 104a (the terms "minor" and "major" referring to the difference in size of the elements), include nine pairs of electromagnets in the stator, such as 104a, with three electromagnet pairs of the rotor, such as 85a. Because of the 13⅓° separation between the major and minor electromagnets in the rotor pair 85a, with the same separation of minor and major electromagnets of the stator pair 104a, the sequence of rotation and discharge described above, with respect to the illustrative example of FIG. 5, involves the following:

1. A minor element 117 of stator pair 104a is aligned with the minor element 91 of rotor pair 85a. On the discharge, this moves the rotor ahead 13⅓°.

2. The major rotor element 122 of the pair 85a now is aligned with the major stator element 120b of the next stator electromagnet pair, in the stator array as shown in FIG. 6. On the discharge, the rotor moves ahead 13⅓°.

3. This brings the minor rotor electromagnet 91 into alignment with the major stator electromagnet 120b of pair 104d, and the major electromagnet 122 (just discharged) of pair 85a into alignment with minor electromagnet 117b of pair 104d, and the rotor spark gap ements into alignment with a different position of gap elements connected with capacitors not discharged in the previous position of the rotor. It should be remembered at this point that it is the positioning of a rotatable spark gap array, similar to that illustrated in FIGS. 17 and 18, which controls the time of discharge of capacitors connected to these gap terminals. Therefore, any electromagnet can be energized twice successively from separate capacitors as the rotor brings appropriate gap terminals into alignment with the coil terminals of a particular electromagnet.

Thus, although major electromagnet 120b of pair 104d has just been energized as described above, it can now be energized again along with minor rotor electromagnet 91 in step 3, because the rotor moved to a new set of terminals of the spark gap arrays connected with capacitors not yet discharged. These capacitors now discharge through rotor electromagnet 91 and stator electromagnet 120b, causing rotor to move ahead another 13⅓°, thus again aligning two minor electromagnets again, these being 117b of stator pair 104d and 91 of rotor pair 85a. The rotor has now moved 40° since step 1 above. The sequence is repeated, and it is to be noted that at each 13⅓° step, the discharges rotate the rotor another 13⅓°. There are 27 steps per revolution with nine stator coil pairs. The discharge sequence is not uniform, as is shown in Table I. In the stator, three major electromagnets 120° apart are energized twice in sequence followed by a hiatus of one step while three minor electromagnets of the stator, 120° apart, are energized during the hiatus. In the rotor the major electromagnets are energized during a hiatus step following two minor electromagnet energization steps. A total of 27 energizations are thus accomplished in the nine pairs of coils of the stator.

In Table I, the leftmost column depicts the location of each rotor arm 85, 86, 87 at an arbitrarily selected step No. 1 position. For example, in step 1 rotor arm 85 has a minor stator and minor rotor electromagnet in alignment for capacitors to discharge through them simultaneously at the 13⅓° position.

TABLE I

CAPACITOR DISCHARGE SEQUENCE FOR ONE REVOLUTION OF ROTOR IN SYSTEM OF FIGS. 5 AND 8

| Step No. | | | Rotor Angle | Rotor Electromagnet | | Stator Electromagnet | |
|---|---|---|---|---|---|---|---|
| Rotor Arm 87 | 85 | 86 | | Minor | Major | Minor | Major |
| 10 | 1 | 19 | 13 1/3° | x | | x | |
| 11 | 2 | 20 | 26 2/3° | | x | | x |
| 12 | 3 | 21 | 40° | x | | x | |
| 13 | 4 | 22 | 53 1/3° | x | | x | |
| 14 | 5 | 23 | 66 2/3° | | x | | x |
| 15 | 6 | 24 | 80° | x | | x | |
| 16 | 7 | 25 | 93 1/3° | x | | x | |
| 17 | 8 | 26 | 106 2/3° | | x | | x |
| 18 | 9 | 27 | 120° | x | | x | |
| 19 | 10 | 1 | 133 1/3° | x | | x | |
| 20 | 11 | 2 | 146 2/3° | | x | | x |
| 21 | 12 | 3 | 160° | x | | x | |
| 22 | 13 | 4 | 173 1/3° | x | | x | |
| 23 | 14 | 5 | 186 2/3° | | x | | x |
| 24 | 15 | 6 | 200° | x | | x | |
| 25 | 16 | 7 | 213 1/3° | x | | x | |
| 26 | 17 | 8 | 226 2/3° | | x | | x |
| 27 | 18 | 9 | 240° | x | | x | |
| 1 | 19 | 10 | 253 1/3° | x | | x | |
| 2 | 20 | 11 | 266 2/3° | | x | | x |
| 3 | 21 | 12 | 280° | x | | x | |
| 4 | 22 | 13 | 293 1/3° | x | | x | |
| 5 | 23 | 14 | 306 2/3° | | x | | x |
| 6 | 24 | 15 | 320° | x | | x | |
| 7 | 25 | 16 | 333 1/3° | x | | x | |
| 8 | 26 | 17 | 346 2/3° | | x | | x |
| 9 | 27 | 18 | 360° | x | | x | |

Similarly, in step 1 rotor arm 86 is at the 133⅓° position with a minor rotor and minor stator electromagnet in alignment for discharge. Simultaneously, rotor arm 87 is at the 253⅓° position with a minor rotor and minor stator in alignment for capacitor discharge therethrough. The other steps of the sequence are apparent from Table I, for each position of the three rotor arms at any step and the juxtapositions of respective stator and rotor electromagnet elements at that position.

In the simplified motor arrangement shown in schematic form in FIG. 18, with single electromagnet configuration the alignment is uniform and the discharge sequences follow sequentially.

As hereinbefore mentioned, a change in speed is effected by displacing the stator spark gap terminals on the rotor (shown at 236 in FIGS. 17 and 18) either counter-clockwise or clockwise 6⅔° so that the discharge position of the stator electromagnets is displaced 6⅔° either clockwise or counter-clockwise of a rotor electromagnet at the time of discharge. Referring to FIGS. 11 to 15, the simultaneous discharge of selected capacitors into the electromagnets so displaced results in a deceleration at the time the rotor electromagnet is just approaching the associated stator, or an acceleration if the rotor electromagnet is just leaving its associated stator electromagnet. In each event, there is a repulsive reaction between the stator and rotor electromagnets, so that if the rotor is approaching the stator, there is a slow-down and if the rotor is receding from the stator there is a speed-up.

Referring to FIG. 11, clutch mechanism 304 about shaft 111 is operated electromagnetically in conventional manner to displace the spark-gap mechanism 236 which is operated normally in appropriate matching alignment with the rotor spark-gap discs 291, 292, 293. Clutch 304 has a fixed drive element 311 containing an electromagnetic drive coil (not shown) and a motor element 310 which, when the electromagnetic drive coil is energized, can be operated by a direct current. The operation of motor element 310 brings into operation spark gap elements 224r, 223r or 223f, 224f of the system shown in FIGS. 4, 5 and 8, as illustrated in FIG. 19.

The fixed stator coil spark gap terminal pairs 223, 224 and 266, 267 are arrayed about a cylindrical frame 322 which is fabricated in insulative material. In the illustrative example of FIGS. 17 and 18, there are nine such spark gap terminal pairs about the periphery of cylinder frame 324. In the engine of FIGS. 4 to 8, a total of 27 such spark gap pairs are involved. In addition, although not shown in the drawing, there are also pairs of terminals, such as 223r or f, 224r or f and 266r or f, 267r or f, displaced 6⅔° on either side of the pairs 223, 224 or 266, 267 and all other pairs in the spark gap array, the letters r and f denoting "retard" and "faster." The latter displaced pairs of used in the control of speed of the engine rotor. The displaced pairs not shown are involved with the operation of cluth 304, the speed changing control element.

Clutch 304 is associated with shaft 111 in that the movable element 310 draws clutch disc element 316 on shaft 111 away from clutch disc element 322 when energized by a voltage of appropriate polarity applied to its motor electromagnet 311. Such clutch drives are well known in the art.

The clutch mechanism 304 of FIGS. 11 and 19, when not energized is in the configuration shown in FIG. 11. The energized configuration of clutch 304 is not specifically illustrated. Upon energization, spark-gap element 222 on disc 236 is displaced rightward, as viewed in FIG. 11, by broken lines 236X, into alignment with the positions of fixed spark-gap terminals 223f, 224f and 267r, 266r. When the disc is in position 236X, the flattened edge 332 of pin 330 in disc 325 rides on surface 350 of disc 322. Normally, the flattened edges 351 of pins 330 are engaged against the flat edge 352 in recess 331 of disc 322. The displacement of disc 322 on shaft 111 is effected by the action of clutch 304 against spring 314 (FIG. 11). An electric switch (not shown) of clutch mechanism 304 energizes it from a d-c power source, and has two positions, one for deceleration and one for acceleration. In either position, clutch 304 is engaged to pull clutch disc 322 from clutch disc 325, momentarily. For the decelerate or the accelerate position, the displaced alignment of spark gap elements 222 is with the 224f, 223f and the 224r, 223r spark-gap terminal elements. However, only the 224f, 223f spark-gap elements are switched into operation with appropriate capacitors for the accelerate position, while in the decelerate position only the 223r and 224r spark-gap elements are switched into the circuit with their associated capacitors.

Of course, when insulative disc 236 is displaced by clutch 304, its gap terminals 222, 225 and 228 (FIGS.

14 and 18) are all displaced into the alignment position of 236X so as to engage the r and f lines of fixed spark gap elements. Although the accelerate and decelerate positions of disc 236 are the same, it is the switching into operation of the 223, 224 or 266, 267 exemplary r or f pairs of terminals which determine whether speed up or slow down action of the rotor will occur.

The momentary displacement of clutch disc 322 from clutch disc 325 results in rotation of disc 325 about disc 322 through an angle of 120°. The detent ball and spring mechanism 320, 321 in disc 325 positions itself between one detent dimple 328 and a succeeding one 328 at a position 120° away on disc 325. As stated, flat 332 of pin 330 rides on surface 350 of disc 322, and pin 330 leaves the pin-holding groove 331/352 along ramp 333 in disc 322 during the momentary lifting of disc 322 by clutch 304. Pin 330 falls back into the next groove 331 at a point 120° further on about disc 322. Pin 330 falls into place in groove 331 on ramp 334. Pins 330 are rotatable in their sockets 353, so that for either clockwise or counterclockwise rotation, the flat 351 will engage the flat 352 by the particular ramp it encounters.

The deceleration or acceleration due to the action of clutch 304 thus occurs within a 120° interval of rotation of disc 325. Disc 322 during this interval may only move a fraction of this arc.

There has been described hereinabove an electromotive engine system wherein at least one electromagnet is in a fixed position and a second electromagnet of similar configuration is juxtaposed with it in a magnetic polarity relationship such that, when the cores of the electromagnets are energized, the juxtaposed core faces repel one another. One core being fixed and the second core being free to move, any attachments to the second electromagnet core will move with it. Hence, if a plurality of fixed cores are positioned about a circular confining housing, and, within the housing, cores on a shaft are free to move, the shaft is rotationally urged each time the juxtaposed fixed and rotatable cores are in alignment and energized. Both the fixed and the movable cores are connected to spark gap terminal elements, and the associated other terminal elements of the spark gaps are connected to capacitors which are changed to a high voltage from pulsed unipolar signal generators. These capacitors are discharged through the electromagnets across the spark gaps. By switching selected groups of capacitors into selected pairs of spark gap elements displaced from the normal uniformly positioned elements for discharge through the electromagnets, the rotor of the circular array systems is accelerated and decelerated.

By confining a fixed electromagnet array in a linear configuration with a linearly movable electromagnet to which a working tool is attached, exciting the juxtaposed pairs of electromagnets by capacitor discharge results in the generation of linear force for such tools as punch presses or for discharging projectiles with considerable energy.

The inventor claims:
1. An electric engine comprings:
a housing;
an array of electromagnets uniformly spaced in said housing to form a stator;
a rotor cage on a shaft journaled in and rotatable within said housing and within said stator, said rotor cage having thereon a spaced array of electromagnets similar to said stator electromagnets and in number comprising an integral fraction of the number of electromagnets in said stator array;
each of the electromagnets of said stator and of said rotor having a magnetizable core of particular configuration and each being wound with a coil such that a pulse of unidirectional electric current through said coil magnetizes the respective core thereof to a particular magnetic polarity, and the faces of rotor cores juxtaposing selected stator cores are magnetized to the same polarity, the juxtaposed cores thereby tending to repel one another, one lead of each of the stator and rotor coils being connected to a common terminal, the other lead of each of said coils being connected to a gap terminal, the gap terminals of said rotor coils being on the rotor and equal in number to the number of coils thereon and matching the positions of said rotor electromagnets thereon, the gap terminals of said stator being equal in number to the number of coils on the stator and disposed uniformly about said stator to match the positions of said stator electromagnets within said housing;
a first array of capacitors each having a terminal in common with the common coil terminal of said stator electromagnets, and each capacitor having its other terminal connected to a gap terminal arrayed adjacent the gap terminal of an electromagnet associated therewith;
a second array of capacitors, each having a terminal in common with said common terminal of said rotor electromagnet coils but equal in number to the number of capacitors in said stator array, the other terminals of said capacitors in said second array being connected to gap terminals arrayed about said housing so as to be in axial alignment with said stator gap terminal positions and being alignable with said rotor gap terminals as said rotor is rotated in said housing and respective gap terminals of said rotor coils pass each second array capacitor gap terminals at a predetermined gap distance;
gap coupling terminals on said rotor equal in number to the number of rotor electromagnet coils and positioned to match the rotor electromagnet positions on said rotor, the gap coupling terminals being rotatable with said rotor so as to pass said adjacent stator coil and associated stator capacitor gap terminal at a predetermined distance therefrom;
a plurality of capacitor charging circuits connected respectively across each of said capacitors in both said first and said second arrays of capacitors for charging each of said capacitors to a predetermined high d-c potential;
a first source of unidirectional electric potential connected to each of said capacitor charging circuits for energizing said charging circuits; and
a second unidirectional electric potential source connected to said electromagnets of said rotor and said stator of such polarity as to receive a charge from the inverse inductive discharge of the electromagnet coils as their fields collapse following the discharge of each capacitor through a rotor or stator electromagnet coil,
whereby whenever a rotor electromagnet is aligned opposite a stator electromagnet, the rotor coil gap terminal of that electromagnet is opposite an associated second capacitor array gap terminal, and a gap coupling terminal of said rotor is aligned opposite the stator electromagnet coil gap terminal and associated first capacitor gap terminal, the capacitors discharge the charge thereon across the gaps through their associated electromagnet coils to magnetize their respective juxtaposed electromagnet cores to cause them to repel one another, thus aligning a succeeding pair of rotor and stator electromagnets for capacitor discharge across their respective gaps, to cause them to repel one another, alignments rotor rotation within the housing continuously bringing successive rotor-stator electromagnets into alignment for discharge of the capacitors therethrough to produce rotary motion of the rotor on said rotor shaft continuously so long as energy from said first source of unidirectional electric potential is applied to said charging circuits to recharge said capacitors after each discharge.

2. In an electric engine having a rotor comprising electromagnetic coil means rotatable within a stator comprising similar electromagnetic coil means, said electromagnetic coil means being polarized for magnetic repulsion;

capacitor means electrically coupled across successive spark gaps to selected ones of said coils of said stator and all of the coils of said rotor;

charging means connected to said capacitor means for charging said capacitor means to an electrical charge potential sufficient to cause arcing across said spark gaps to result in the discharge of said capacitor means through the electromagnetic coils so that the electromagnetic coil means repel one another; and a unidirectional electric power source connected to said charging means to energize said charging means to continue charging said capacitor means following each discharge whereby the rotor of said engine is maintained in rotation by the successive discharges of said capacitor means across successive spark gaps into said electromagnetic coil means.

3. An electric engine according to claim 2, wherein: the charging means includes electronic square core oscillators connected to said unidirectional electric power source and includes step-up means and a rectifier to produce a substantial voltage step up from the voltage of said power source.

4. An electric engine according to claim 2, wherein: the charging means includes a vibrator connected to said power source, and step up transformer and rectifier means to provide a high voltage for charging said capacitor means.

5. A motive force producing means comprising:
at least a first electromagnet means including at least one coil wound about a core,
at least a second electromagnet means including at least one coil wound about a core similar to said first core,
the respective cores being positioned adjacent to one another so that the magnetic polarities of the adjacent core surfaces are the same when a unidirectional electric current is passed through the coils,
at least one capacitor means having one terminal thereof connected to one terminal of both of said electromagnet coils,
the other terminal of said capacitor means being connected to one terminal of a spark gap means, the other terminals of the coils of both said first and said second electromagnet means being connected to the other terminal of said spark gap means,
at least one unidirectional pulse charging means connected to said capacitor means to charge said capacitor means to a relatively high potential sufficient to arc across said spark gap means at predetermined spacing of said gap terminals, and
a source of unidirectional potential connected to said charging circuit to energize said charging means,
whereby upon application of current from said potential source to said charging means the successive pulses generated thereby charge said capacitor means to a voltage level sufficient to arc across said spark gap means to produce a discharge path for said capacitor means through said coils to cause said electromagnet means to repel one another with a substantial force.

6. A motive force producing means according to claim 5, wherein:
said first electromagnet means is secured in a relatively stable housing, and said second electromagnet means is connected with and freely movable relative to said stable housing, and has utilization means connected thereto for performing work therewith when said capacitor means discharges through said coils of said electromagnet means.

7. A motive force producing means according to claim 6, wherein said utilization means is a motor rotor coupled with said second electromagnet means and said first electromagnet means is a stator.

8. A motive force producing means according to claim 6, wherein said utilization means is a piston attached to said second electromagnet means and is movable therewith to produce hammer-like blows when said capacitor means discharges through said electromagnet means.

9. In an electromotive force generating system as disclosed, means for accelerating or decelerating the motion of a force generating system, said means comprising:
at least two juxtaposed electromagnetic core elements, one fixed and one movable, including coils wound thereabout to provide a repulsion tendency when said cores are energized,
spark gap termimals connected with said coils,
capacitor means connected with said spark gap terminals to discharge across said spark gap terminals through said coils when a charge of sufficient voltage level appears across said capacitor means, thus to energize said juxtaposed electromagnets to induce said juxtaposed electromagnet cores to repel one another,
charging means connected to said capacitors for charging them to said sufficient voltage level, and
selective positioning means coupled with said spark gap terminals and with at least said movable electromagnet core to cause selective displacement of said movable core with respect to said fixed core to accelerate or decelerate the motion of the movable core relative to the fixed core.

10. An electromotive force generating system according to claim 9, wherein:
said juxtaposed electromagnetic cores include a plurality of fixed cores and a smaller number of movable cores, said smaller number being an integral fraction of the number of fixed cores, and said selective positioning means is an electromagnetic clutch coupled with said smaller number of movable cores for movement therewith, and includes selective displacement means coupled with said spark gap terminals connected with selected capacitors in said capacitor means and selected combinations of coils in said plurality of fixed electromagnets.

11. The method of generating motive power comprising the steps of:
   a. positioning similar electromagnets in juxtaposed relationship with their respective cores arranged for repulsion when said electromagnets are energized,
   b. charging capacitors to a relatively high potential, and
   c. discharging said capacitors simultaneously through said electromagnets across spark gaps set to break down at said relatively high potential, thereby to cause said similar electromagnets to repel one another with considerable force.

12. The method of generating motive power defined in claim 11, wherein in said positioning step at least one of said electromagnets is maintained in a fixed position and another electromagnet is free to move relative to said fixed electromagnet.

13. The method of generating motive power according to claim 11, wherein:
   the charging step includes the charging of capacitors to a relatively high potential from a pulsed unipolar source of electric energy.

14. In an electromagnetic capacitor discharge engine including movable electromagnets and fixed electromagnets, said movable electromagnets being movable into polar alignment with said fixed electromagnets, capacitor means, means for charging said capacitor means, and means for discharging said charged capacitor means through said fixed and movable electromagnets to polarize aligned fixed and polarized electromagnets for magnetic repulsion, an acceleration and deceleration control means comprising:
   first selective means for momentarily delaying the discharge of the capacitors until the movable electromagnets in said engine have begun to recede from the fixed electromagnets, in order to accelerate the motion of said movable electromagnets by the added impetus of the repulsion, and
   second selective means for momentarily accelerating the discharge of the capacitors to occur at a point in the motion of the movable electromagnets where said movable electromagnets are approaching said fixed electromagnets to decelerate the motion of said movable electromagnet by the tendency to repel the approaching electromagnet by the fixed electromagnet.

15. An electric engine, comprising:
   fixed electromagnets;
   movable electromagnets movable into alignment with said fixed electromagnets;
   capacitor means;
   means for charging said capacitor means; and
   means for discharging said charged capacitor means through said fixed and movable electromagnets to polarize said aligned fixed and movable electromagnets for magnetic repulsion.

16. An electric engine as recited in claim 15, wherein: said means for discharging said charged capacitor means comprises voltage breakdown switch means.

17. An electric engine as recited in claim 16, wherein:
   said voltage breakdown switch means includes at least one terminal movable with at least one of said movable electromagnets for breaking down when said at least one of said movable electromagnets is in alignment with a said fixed electromagnet.

18. An electric engine as recited in claim 17, wherein:
   said voltage breakdown switch means comprises a spark gap means.

* * * * *